(12) United States Patent
Lee et al.

(10) Patent No.: US 9,008,112 B1
(45) Date of Patent: Apr. 14, 2015

(54) NETWORK SWITCH

(75) Inventors: Chee How Lee, Singapore (SG); Chee Cheng Jeffrey Liang, Singapore (SG); Keng Hua Chuang, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 1316 days.

(21) Appl. No.: 12/389,100

(22) Filed: Feb. 19, 2009

(51) Int. Cl.
*H04L 12/66* (2006.01)
*H04L 12/931* (2013.01)
*G08B 5/24* (2006.01)
*G06F 1/32* (2006.01)

(52) U.S. Cl.
CPC ..................................... *G06F 1/3215* (2013.01)

(58) Field of Classification Search
USPC .......... 370/463, 464; 315/291–292, 297, 307, 315/315, 312, 320, 360, 362; 340/815.45, 340/815.65
See application file for complete search history.

(56) References Cited

U.S. PATENT DOCUMENTS

| | | | |
|---|---|---|---|
| 6,169,491 B1 * | 1/2001 | McDonald | 340/815.4 |
| 7,940,787 B2 * | 5/2011 | Karam | 370/419 |
| 7,966,502 B2 * | 6/2011 | Diab et al. | 713/300 |
| 8,035,320 B2 * | 10/2011 | Sibert | 315/312 |
| 8,058,815 B1 * | 11/2011 | Hardy | 315/291 |
| 8,395,496 B2 * | 3/2013 | Joshi et al. | 340/539.1 |
| 2003/0216151 A1 * | 11/2003 | Kitano et al. | 455/556.1 |
| 2004/0179470 A1 * | 9/2004 | Nguyen et al. | 370/216 |
| 2006/0047800 A1 * | 3/2006 | Caveney et al. | 709/223 |
| 2008/0139120 A1 * | 6/2008 | Chase | 455/41.2 |
| 2009/0228722 A1 * | 9/2009 | Lin | 713/300 |
| 2011/0141943 A1 * | 6/2011 | Shifris et al. | 370/254 |

\* cited by examiner

*Primary Examiner* — Candal Elpenord
(74) *Attorney, Agent, or Firm* — Dicke, Billig & Czaja

(57) ABSTRACT

A switch module includes multiple ports, each port electrically communicating with a port light emitting diode (LED), where each port LED is configured to emit light to indicate power delivery out of the port, and each port LED is configured to emit one of a plurality of light colors to indicate a power level delivered out of the port.

17 Claims, 3 Drawing Sheets

NETWORK SWITCH

BACKGROUND

Power over Ethernet (PoE) provides network connectivity with both power and data transmission to remote devices. PoE is employed to power telephones, wireless local area networks access points, network cameras, remote network switches, embedded appliances, and other devices. PoE can be implemented according to IEEE 802.3-2005 Standard (referred to as IEEE802.3af). This Standard specifies powering devices at a voltage of between 36-57 V DC over Cat. 3/Cat. 5e cables with a selectable current of between 10-400 mA subject to a maximum power load of 15.4 Watts. In practice, only about 12.95 Watts of power is typically available out of PoE due to power losses in the cables.

A PoE switch includes one or more ports to which an external device is connected. Each port includes a pair of light emitting diodes (LEDs). A link LED typically emits green light to indicate that a power link is established with the external device and amber light to indicate identification of a fault in product code. A mode LED is typically configured to emit a single color of light to indicate traffic of data through the port.

Users of PoE switches desire improved function and performance, especially as PoE implementation expands.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

It is to be understood that the features of the various exemplary embodiments described herein may be combined with each other, unless specifically noted otherwise.

Embodiments provide a system configured to control visual display of network information. In one embodiment, the system is configured to control the visual display of Ethernet information at a switch and includes one or more Ethernet switch modules, where each Ethernet switch module includes a tri-color port light emitting diode (LED) and a mode LED for each port in the module.

In contrast to the conventional power over Ethernet (PoE) switch LEDs described above in the Background, the port LEDs of switch module embodiments described herein are configured to emit a first color of light to indicate a first power level delivered out of the port and emit a second color of light different than the first color of light to indicate a second power level delivered out of port. In one embodiment, each Ethernet switch module includes multiple ports, and each port includes a tri-color port LED configured to selectively emit one of many different available light colors (e.g., red, orange, yellow, green, blue, etc.) to indicate the level of power drawn out of the port by an external device. The port LEDs of switch module embodiments described herein are applicable for use with any Ethernet device capable of delivering power over Ethernet (PoE) or power over Ethernet plus (PoEP).

Figure 1:
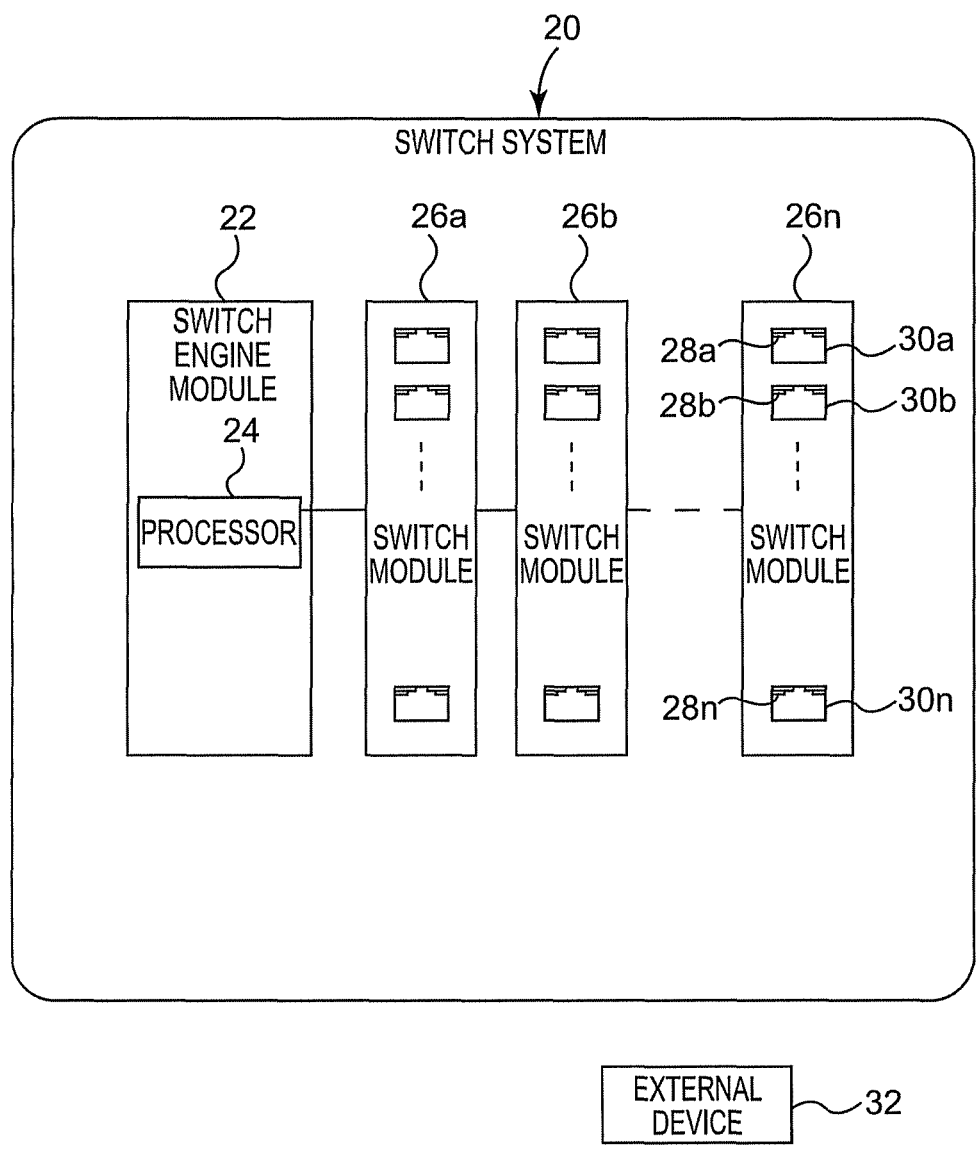
FIG. 1 is a schematic block diagram of a switch system configured to control visual display of network information from a switch according to one embodiment.

FIG. 1 is a schematic block diagram of a switch system 20 configured to control visual display of network information from a switch according to one embodiment. Switch system 20 includes a switch engine module 22 having a processor 24 that electrically communicates with one or more switch modules 26a-n to signal a port light emitting diode 28a-n (port LED 28a-n) to selectively emit one color of light from a range of available colors of light to indicate a power level delivered from one of ports 30a-n to an external device 32.

Figure 4:
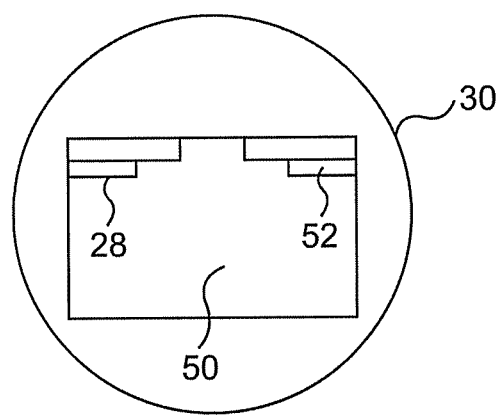
FIG. 4 is a front view of a port of an Ethernet switch module including a port light emitting diode (LED) according to one embodiment.

In one embodiment, switch engine module 22 is an Ethernet switch engine module and processor 24 electrically communicates with one or more Ethernet switch modules 26 to signal port LEDs 28 to selectively emit a first color of light to indicate a first power level delivered out of port 30 to external device 32 and emit a second color of light different than the first color of light to indicate a second power level delivered out of port 30 to external device 32. In addition, processor 24 also communicates with a mode LED associated with each port 30, for example mode LED 52 (FIG. 4).

In one embodiment, processor 24 communicates with Ethernet switch module 26 to signal port LED 28 to emit a first color of light to indicate power delivery out of port 30 and to emit a second different color of light to indicate the power level delivered from port 30 to external device 32. The second color of light will change color (light will be emitted at select targeted peak wavelengths) as the power level delivered from port 30 to external device 32 changes. In one embodiment, processor 24 is configured to sense at least four different power levels delivered from port 30 and signal each port LED 28 to emit a different color of light for each of the four different power levels. In one embodiment, port LED 28 is provided as a link LED.

In one embodiment, system 20 includes multiple Ethernet switch modules 26a, 26b . . . 26n, and each of the Ethernet switch modules 26 includes multiple ports 30a, 30b . . . 30n. At least one port LED 28 is in electrical communication with each one of the ports 30 for visually displaying a status of power delivery out of that particular port 30 and/or a level of power delivered from that particular port. For example, port LED 28a provides a visual indication of the level of power drawn from port 30a, and port LED 28b provides a visual indication of the level of power drawn from port 30b, where the color of the light emitted from port LED 28a is the same as the light emitted from port LED 28b (when the power levels out of ports 30a, 30b are the same) and the color of the light emitted from port LED 28a is the different from the light emitted from port LED 28b (when the power levels out of ports 30a, 30b are different).

In one embodiment, switch engine module 22 is configured to control each of Ethernet switch modules 26a-n with processor 24. In one embodiment, switch engine module 22 is an insertable switch or blade configured to be stowed in a cabinet or a chassis alongside one or more Ethernet switch modules 26a-n.

In one embodiment, processor 24 includes power sourcing equipment logic configured to negotiate with external device 32 upon connection with one of ports 30. In one embodiment, the power sourcing equipment logic integrated with processor 24 is configured to measure current flow from port 30 to external device 32 and assign a class to the external device 32. The power sourcing equipment logic measures current flow until it is able to detect a signature that authorizes external device 32 to draw power from port 30. If the power sourcing equipment logic is unable to detect a signature from external device 32, then no power is delivered from port 30.

In one embodiment, processor 24 and/or port 30 is configured with an under voltage lock out function that will not supply power to external device 32 until a signature and a classification of the external device 32 is identified by processor 24 and the powers sourcing equipment logic. In one embodiment, when external device 32 is electrically connected to one of ports 30, port LED 28 emits a specific color of light that is selected to indicate a class of power level drawn by external device 32 from port 30. In one embodiment, each port LED 28 is configured as a tri-color LED configured to selectively emit one specific peak wavelength of light for each different power level class (depending upon power drawn from port 30).

In one embodiment, system 20 is configured to provide power from ports 30 to external device 32 in compliance with IEEE802.3af Standard in classes 0, 1, 2, 3, and 4. Class 1 provides a maximum power level between 0.44-3.84 Watts. Class 2 provides maximum power levels between 3.84-6.49 Watts. Class 3 provides maximum power levels between 6.49-12.95 Watts. Class 0 provides maximum power levels between 0.44-12.94 Watts. Class 4 provides a maximum power level between 12.95-25.5 Watts. In one embodiment, Ethernet switch modules 26 are configured to support a two-layer power classification including the current power classification for the IEEE802.3af Standard in addition to maximum power levels that exceed the current standard, including PoE, PoEP, and further power over Ethernet capabilities.

System 20 is compatible with a variety of Ethernet switch modules including 24-port stackable switches, 48-port stackable switches, chassis switches, including PoE and PoEP switches.

Figure 2:
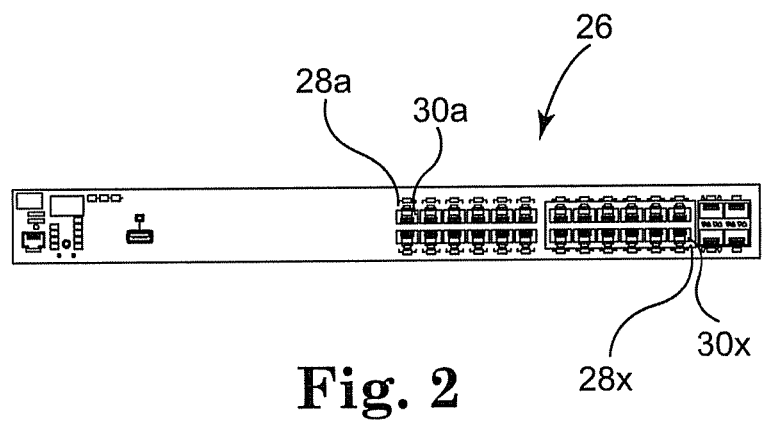
FIG. 2 is a front view of a stackable Ethernet switch module according to one embodiment.

FIG. 2 is a front view of a 24-port stackable Ethernet switch module 26 according to one embodiment. Stackable Ethernet switch module 26 includes 24 ports 30a-30x and each of the ports 30 includes a respective port LED 28a-28x. Each port LED 28 is configured to emit light to indicate power delivery out of port 30, and each port LED 28 is configured to emit one of a plurality of light colors to indicate a power level delivered out of port 30. For example, in the case that port 30a is connected with and delivering class 1 power of 3 Watts to external device 32 (FIG. 1), port LED 28a is illuminated at a peak wavelength of 565 nm (i.e., green light) to indicate that 3 Watts of power is available to external device 32; in the case that port 30x is connected with and delivering power of 30 Watts to external device 32 (FIG. 1), port LED 28x is illuminated at a peak wavelength of 635 nm (i.e., red light) to indicate that 30 Watts of power is available to external device 32. It is to be understood that each port LED 28 is configured for selective continuous illumination at any one of many peak wavelengths throughout the color spectrum. In addition, each port LED 28 is configured to blink on/off at any one of many peak wavelengths throughout the color spectrum.

In one embodiment, each port LED 28 is provided as a tri-color LED configured to emit a first color of light to indicate power delivery out of port 30, a second color of light to indicate a first power level delivered out of port 30, and at least a third color of light to indicate at least a second different power level out of port 30. It is to be understood that tri-color LED is configured to emit more than one color of light, including for example, a first color, a second color, a third color, and more colors, where each color is emitted at a different peak wavelength and indicates a different power level delivered by port 30.

Figure 3:
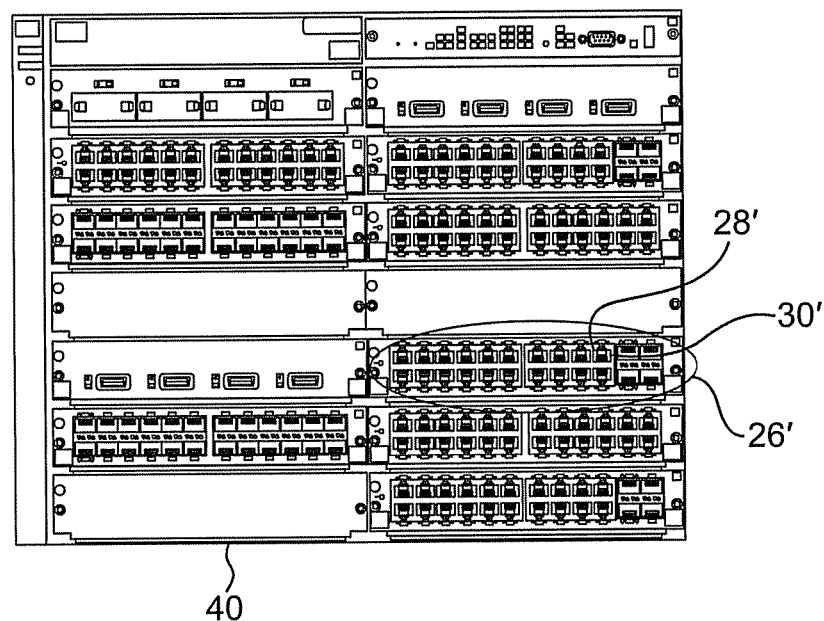
FIG. 3 is a front view of a chassis Ethernet switch module according to one embodiment.

FIG. 3 is a front view of a chassis Ethernet switch module 26' including multiple ports 30', where each of the ports 30' includes a port LED 28'. The number of ports 30' is variable and dependent on the number of additional PoE or PoEP blades inserted into chassis 40.

FIG. 4 is a front view of Ethernet port 30 including a receptacle 50, port LED 28, and a mode light emitting diode 52 (mode LED 52). Port 30 and receptacle 50 are configured for connection to external device 32 (FIG. 1), for example via a Cat. 3/Cat. 5 cable. Port LED 28 is provided to indicate power draw and the level of power drawn from receptacle 50, and mode LED 52 is provided to indicate traffic level of data transmitted from port 30. In one embodiment, mode LED 52 is a bi-color (green or amber) LED. In one embodiment, mode LED 52 is a tri-color LED similar to port LED 28 and configured to selectively emit any color from the color spectrum to display power, power level, or data traffic information relative to port 30.

In one embodiment, port 30 and receptacle 50 are provided as 10/100/1000 megabit ports and mode LED 52 is provided to indicate on/off activity and transmit/receive activity of port 30. In one embodiment, port 30 and receptacle 50 are provided as 10/100/1000 megabit twisted pair ports.

In one embodiment, port LED 28 is provided as a tri-color light emitting diode configured to emit light to indicate power delivery out of port 30 and also configured to emit a different wavelength of light to indicate power level delivered out of port 30. In one embodiment, receptacle 50 and port 30 are configured to provide many levels of power output including the power output levels of IEEE 802.3af Standard classes 0, 1, 2, 3, and 4 as well as PoEP, and port LED 28 is configured to emit a different peak wavelength (color) of light for each power level delivered out of port 30.

The color emitted from a LED is generally identified by its peak wavelength as measured in nanometers. In one embodiment, each port LED 28 is configured to emit a first peak wavelength (a first color) of light to indicate power delivery out of port 30 and a second peak wavelength of light (a second color) that is different than the first color of light to indicate a power level delivered out of port 30. For example, in one embodiment port LED 28 emits red light for class 0 power levels of between 0.4-12-94 Watts, orange light for maximum power levels between 0.44-3.84 Watts for class 1, green light for maximum power levels between 3.84-6.49 Watts for class 2, and blue light for maximum power levels between 6.49-12.95 Watts for class 3. It is to be understood that the color of the peak wavelength of light emitted by port LED 28 is not limited to the above example and can include colors associated with peak wavelengths of light emitted between the wavelengths 430 nm (ultra blue light) to 635 nm (high efficiency red light).

In one embodiment, port LED 28 is provided as a semiconductor LED including an anode lead attached to a whisker and a cathode power lead attached to an anvil, where these components are preferably secured within a high impact plastic lens. LEDs are configured to be highly monochromatic to emit a pure color of light in narrow frequency range. In general, LEDs are current-driven devices where the drive current and light output relates proportionally. The color emitted from a LED is generally identified by its peak wavelength, and in one exemplary embodiment port LED 28 selectively emits light between the wavelengths of about 430 nm (ultra blue light) to red light having a wavelength of about 635 nm.

In one embodiment, port LED 28 is provided as a red, green, blue (RGB) tri-color LED and is configured to emit white light where light from all parts of the visible spectrum overlap. In one embodiment, port LED 28 includes a phosphor layer of, for example, Yttrium aluminum garnet on the surface of a blue (gallium nitride) chip.

In one embodiment, the red, green, blue (RGB) tri-color port LED 28 is a combination RBG light emitting diode. The combination RBG light emitting diode provides color mixing and is configured to output approximately 255 different colors of light.

Figure 5:
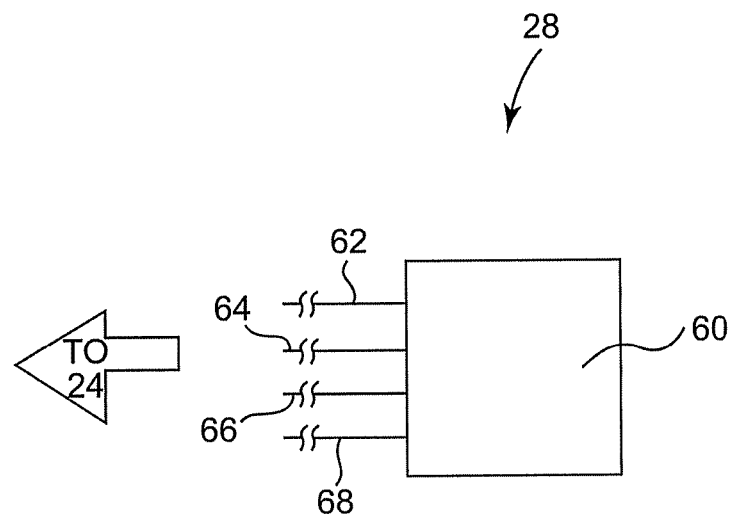
FIG. 5 is a schematic representation of a tri-color Ethernet port LED connectable to a processor of a switch engine module according to one embodiment.

FIG. 5 is a block diagram of pin functionality of port LED 28 according to one embodiment. In one embodiment, port LED 28 is a tri-color RGB light emitting diode 60 including three pins 62, 64, 66 (e.g., RGB pins 62, 64, 66). In one exemplary embodiment, pins 62, 64, 66 are wired such that pin 62 delivers current to diode 60 to emit red (R) light, pin 64 delivers current to diode 60 to emit green (G) light, pin 66 delivers current to diode 60 to emit blue (B) light, and pin 68 is wired to ground. The three pins 62, 64, 66 of RGB diode 60 communicate with processor 24 (FIG. 1), which selectively delivers current to diode 60 to drive diode 60 to emit one particular color from the spectrum of RGB colors.

Port LED 28 is configured to selectively emit one or more colors from diode 60 in a continuous on mode or in a blinking mode. In one embodiment, power level out of port 30 (FIG. 4) is indicated by selectively emitting a first color of light continuously from port LED 28, and a transmission rate of data from port 30 is indicated by a blinking color of light from mode LED 52 (FIG. 4). For example, high rates of data transmission are indicated by a relatively high frequency rate of blinking for mode LED 52 of about 600 Hz, and low rates of data transmission are indicated by a relatively low frequency rate of blinking for mode LED 52 of about 60 Hz. In one embodiment, processor 24 is configured to signal each port LED 28 to emit one from a full spectrum of about 255 different colors of light to indicate a range of power levels delivered out of port 30 to external device 32 (FIG. 1).

In one embodiment, system 20 (FIG. 1) is configured to control visual display of network information from a switch by emitting a first color of light from tri-color LED 28 (FIG. 4) to indicate a first power level delivered out of port 30 and by emitting a second color of light from tri-color LED 28 different than the first color of light to indicate a second power level delivered out of port 30. For example, port LED 28 will emit a purple color of light to indicate a class 1 power level of 2 Watts delivered out of port 30 and a pink color of light to indicate a class 2 power level of 5 Watts delivered out of port 30. In addition, as PoE implementations evolve, port LED 28 is configured to selectively emit different colors of light to indicate different classes/levels of power delivered out of port 30, e.g., power levels above 25 or more Watts, such as 60 Watts or 100 Watts.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments of tri-color port LEDs as discussed herein. Therefore, it is intended that this invention be limited only by the claims and the equivalents thereof.

What is claimed is:

1. A switch system comprising:
a switch module including multiple ports, each port electrically communicating with a port light emitting diode (LED), wherein each port LED is controlled to emit one of a plurality of light colors to indicate a power level delivered out of the port; and
a processor connected to the switch module, wherein the processor is to detect a signature of an external device and to allow the external device to draw power from one of the ports in response to detection of the signature, and wherein the processor is to sense at least four different power levels and signal each port LED to emit a different color of light for each of the four different power levels.

2. The switch system of claim 1, wherein each port LED is to emit a first color of light to indicate power delivery out of the port and a second color of light different than the first color of light to indicate power level delivered out of the port.

3. The switch system of claim 1, wherein each port LED is to emit a different colored light for each of the different power levels delivered out of the port.

4. The switch system of claim 1, wherein the processor is to prevent the external device from drawing power from the port in response to the signature not being detected.

5. The switch system of claim 1, wherein each port LED is to emit light to indicate a power level of greater than 15 Watts delivered out of the port to a device communicating with an Ethernet switch.

6. The switch system of claim 1, wherein the switch module is an Ethernet switch module comprising multiple Ethernet ports.

7. The switch system of claim 1, wherein each port LED comprises a tri-color link LED.

8. A method of controlling visual display of Ethernet information, the method comprising:
detecting, by a processor, a signature of an external device;
allowing, by the processor, the external device to draw power from one of a plurality of ports of a switch module in response to detection of the signature;
sensing, by the processor, at least four different power levels; and
controlling a tri-color LED associated with the port to emit a different color of light for each of the four different power levels, including
controlling the tri-color LED to emit a first color of light to indicate a first power level delivered out of the port of the switch module; and controlling the tri-color LED to emit a second color of light different than the first color of light to indicate a second power level delivered out of the port of the switch module.

9. The method of claim 8, comprising controlling the tri-color LED to emit at least a third color of light different than the first and second colors of light to indicate at least a third power level delivered out of the port of the switch module.

10. The method of claim 8, comprising controlling the tri-color LED to emit a third color of light different than the first and second colors of light to indicate power delivery by the port.

11. The method of claim 8, wherein controlling the tri-color LED to emit the first color of light includes controlling the tri-color LED comprises controlling the tri-color LED to emit a first peak wavelength of light indicating the power level of one of class 0, class 1, class 2, class 3, and class 4 delivered out of the port.

12. The method of claim 11, comprising controlling the tri-color LED to emit the second color of light includes controlling the tri-color LED to emit a second peak wavelength of light indicating a power level of between 25-60 Watts delivered out of the port.

13. A system to control visual display of Ethernet information, the system comprising:
an Ethernet switch module comprising multiple ports, each port comprising a port light emitting diode (LED); and
a switch engine module comprising a processor in electrical communication with the Ethernet switch module,
wherein the processor is to detect a signature of an external device and to allow the external device to draw power from one of the multiple ports in response to detection of the signature,
wherein the processor is to sense a power level drawn out of the port by the external device,
wherein the processor is to signal a port LED associated with the port to emit a first color of light indicating power delivery at a first of at least two power levels to the external device and a second color of light different than the first color of light indicating power delivery at a second of the at least two power levels to the external device, and
wherein the processor is to sense at least four different power levels and signal each port LED to emit a different color of light for each of the four different power levels.

14. The system of claim 13, wherein the processor is to sense at least one power level between 0-15 Watts delivered to a first external device connected to a first one of the ports and at least one power level between 15-60 Watts delivered to a second external device connected to a second one of the ports.

15. The system of claim 13, wherein the processor is to prevent the external device from drawing power from the port in response to the signature not being detected.

16. The system of claim 13, wherein each port LED comprises a combination red, blue, green (RGB) light emitting diode.

17. The system of claim 16, wherein the combination RGB light emitting diode comprises a color mixing diode configured to output at least 255 different colors of light.

* * * * *